(12) United States Patent
Bays et al.

(10) Patent No.: US 6,965,974 B1
(45) Date of Patent: Nov. 15, 2005

(54) DYNAMIC PARTITIONING OF MEMORY BANKS AMONG MULTIPLE AGENTS

(75) Inventors: Laurence Edward Bays, Allentown, PA (US); Jalil Fadavi-Ardekani, Orefield, PA (US); Srinivasa Gutta, Allentown, PA (US); Bahram Ghaffarzadeh Kermani, Whitehall, PA (US); Richard Joseph Niescier, Bethlehem, PA (US); Geoffrey Lawrence Smith, Tinton Falls, NJ (US); Walter G. Soto, Irvine, CA (US); Daniel K. Greenwood, Red Bank, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/120,126

(22) Filed: Jul. 22, 1998

Related U.S. Application Data

(60) Provisional application No. 60/065,855, filed on Nov. 14, 1997.

(51) Int. Cl.[7] ............................................. G06F 12/00
(52) U.S. Cl. ..................... 711/153; 711/154; 711/173
(58) Field of Search ....................... 711/147, 148, 153, 711/154, 167, 170, 173, 171; 365/233; 713/400

(56) References Cited

U.S. PATENT DOCUMENTS

| | | | | |
|---|---|---|---|---|
| 4,209,839 A | * | 6/1980 | Bederman | .................. 364/200 |
| 4,476,527 A | * | 10/1984 | Clayton, IV | ................ 364/200 |
| 4,827,401 A | * | 5/1989 | Hrustich et al. | ............ 364/200 |
| 4,965,717 A | * | 10/1990 | Cutts, Jr. et al. | ........... 364/200 |
| 5,008,816 A | * | 4/1991 | Fogg, Jr. et al. | ............ 364/200 |
| 5,333,293 A | * | 7/1994 | Bonella | ...................... 395/425 |
| 5,463,755 A | * | 10/1995 | Dumarot et al. | ............ 395/475 |
| 5,621,698 A | | 4/1997 | Lee | |
| 5,630,096 A | * | 5/1997 | Zuravleff et al. | ........... 395/481 |
| 5,659,715 A | * | 8/1997 | Wu et al. | .............. 395/497.01 |
| RE35,723 E | * | 2/1998 | Takasugi | ............... 365/189.05 |
| 5,758,132 A | * | 5/1998 | Strahlin | ...................... 328/154 |
| 5,784,582 A | * | 7/1998 | Hughes | ...................... 395/297 |
| 5,815,167 A | * | 9/1998 | Muthal et al. | .............. 345/512 |

(Continued)

FOREIGN PATENT DOCUMENTS

GB 2074762 * 11/1981

*Primary Examiner*—Kimberly McLean-Mayo

(57) ABSTRACT

A multiple agent system providing each of a plurality of agents, e.g., processors, to access a shared synchronous or asynchronous memory. In the case of synchronous memory, the clock signal from a super agent selected from among the plurality of agents provides a memory access clock signal to the other agents accessing the same shared memory. The other agents synchronize their respective address, data and control busses to those of the super agent, and output a representation of the same clock signal to the shared memory. In another aspect of the present invention, the shared memory is partitioned for use from among a plurality of groups of agents, each agent group comprising one or more agents. Any one of the agents may update a configuration register to flexibly reconfigure the amount of shared memory available to the agents as necessary.

20 Claims, 7 Drawing Sheets

U.S. PATENT DOCUMENTS

| | | | |
|---|---|---|---|
| 5,838,934 A * | 11/1998 | Boutaud et al. | 395/280 |
| 5,911,149 A * | 6/1999 | Luan et al. | 711/147 |
| 5,933,855 A * | 8/1999 | Rubinstein | 711/200 |
| 5,939,919 A * | 8/1999 | Proebsting | 327/295 |
| 5,960,458 A * | 9/1999 | Kametani | 711/147 |
| 5,999,197 A * | 12/1999 | Satoh et al. | 345/515 |
| 6,035,365 A * | 3/2000 | Farmwald et al. | 710/129 |
| 6,041,066 A * | 3/2000 | Meki et al. | 370/438 |
| 6,052,756 A * | 4/2000 | Barnaby et al. | 711/154 |
| 6,101,146 A * | 8/2000 | Maesako et al. | 365/230.03 |
| 6,185,704 B1 * | 2/2001 | Pawate et al. | 714/719 |

* cited by examiner

DYNAMIC PARTITIONING OF MEMORY BANKS AMONG MULTIPLE AGENTS

This application claims priority from U.S. Provisional Application No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to the shared usage of memory by a plurality of agents, i.e., processors. In particular, in one aspect it relates to the efficient use of shared synchronous memory by a plurality of agents, and in another aspect it relates to the flexible partitioning of shared memory between a plurality of agents.

2. Background of Related Art

With the ever-increasing speeds of today's processors, memory designs have attempted to meet the required speed requirements. For instance, synchronous memory such as synchronous static random access memory (SSRAM) and synchronous dynamic random access memory (SDRAM) are commonly available synchronous types of memory.

Synchronous memory technology is currently used in a wide variety of applications to close the gap between the needs of high-speed processors and the access time of asynchronous memory such as dynamic random access memory (DRAM). Synchronous memory, e.g., SDRAM technology, combines industry advances in fast dynamic random access memory (DRAM) with a high-speed interface.

Functionally, an SDRAM resembles a conventional DRAM, i.e., it is dynamic and must be refreshed. However, the SDRAM architecture has improvements over standard DRAMs. For instance, an SDRAM uses internal pipelining to improve throughput and on-chip interleaving between separate memory banks to eliminate gaps in output data.

The idea of using a SDRAM synchronously (as opposed to using a DRAM asynchronously) emerged in light of increasing data transfer demands of high-end processors. SDRAM circuit designs are based on state machine operation instead of being level/pulse width driven as in conventional asynchronous memory devices. Instead, the inputs are latched by the system clock. Since all timing is based on the same synchronous clock, designers can achieve better specification margins. Moreover, since the SDRAM access is programmable, designers can improve bus utilization because the processor can be synchronized to the SDRAM output.

The core of an SDRAM device is a standard DRAM with the important addition of synchronous control logic. By synchronizing all address, data and control signals with a single clock signal, SDRAM technology enhances performance, simplifies design and provides faster data transfer.

Similar advantage hold for other types of synchronous memory, e.g., SSRAM or even synchronous read only memory.

Synchronous memory requires a clock signal from the accessing agent to allow fully synchronous operation with respect to the accessing agent. If more than one agent is given access to a shared synchronous memory, each agent must conventionally supply its own clock signal to the synchronous memory. Unfortunately, the clock signals from separate agents are not conventionally synchronous or in phase with one another. Therefore, if a synchronous memory were to be shared among a plurality of agents, delays or wait states would be required to allow an error-free transition between access by the first agent having a first synchronous memory access clock signal and a subsequent access by another agent having a different synchronous memory access clock signal.

Some synchronous memory devices have the capability to provide burst input/output (I/O), particularly for the optimization of cache memory fills at the system frequency. Advanced features such as programmable burst mode and burst length improve memory system performance and flexibility in conventional synchronous memories, and eliminate the need to insert otherwise unnecessary wait states, e.g., dormant clock cycles, between individual accesses in the burst.

Conventional SDRAM devices include independent, fixed memory sections that can be accessed individually or in an interleaved fashion. For instance, two independent banks in an SDRAM device allow that device to have two different rows active at the same time. This means that data can be read from or written to one bank while the other bank is being precharged. The setup normally associated with precharging and activating a row can be hidden by interleaving the bank accesses.

There are limitations to conventional system designs using synchronous memory. For instance, wait states are inevitable and necessary when the shared synchronous memory adjusts for access by a different agent having a different clock signal.

For instance, FIG. 5 shows a conventional circuit for allowing, e.g., three agents 502–506 to access a shared synchronous memory block 508. Each agent 502–506 may be a suitable processor, e.g., a microprocessor, a microcontroller, or a digital signal processor (DSP). As shown in FIG. 5, the processors 502–506 provide read and/or write access to the shared synchronous memory block 508.

As may be appreciated, memory accesses by the separate agents 502–506 would clash unless they are arbitrated to allow only one agent to access the synchronous memory 508 at any one time. Thus, selection logic (i.e., an arbitrator 512) is conventionally provided to control a multiplexer 510, which selects the appropriate address for presentation to the synchronous memory 508, data and control (ADC) signals and clock signal from a current 'owner' of the busses. Typically, the agents 502–506 are assigned a hierarchy in which the highest priority agent will own the busses to the synchronous memory 508 and block out accesses by the other agents until finished.

Unfortunately, in such a system as is shown in FIG. 6, if the relative speeds of the agents 502–506 vary and/or the relative phase of the clock signals from each of the respective agents 502–506 varies with respect to one another, accesses to the synchronous memory 508 may necessarily include wait states. Wait states decrease the overall speed of accesses to the synchronous memory 508 and result in decreased performance.

Moreover, as background to another aspect of the invention, a plurality of separate memory systems 600 may be provided as shown in FIG. 6, using one or more arbitrators 612 to authorize access to the respective separate memory blocks 508a, 508b by the separate agents. However, the memory block 508a must be sized with respect to the maximum required amount of memory by the pre-defined groups of accessing agents 602–606, and the memory block 508b must be sized with respect to the maximum required amount of memory by the pre-defined groups of accessing agents 622–626. However, in practice, the synchronous memory blocks 508a, 508b are less than fully utilized, thus wasting memory. Moreover, if a particular use or application of the device uses one agent but not others, the memory pre-defined for use by the unused agent is wasted.

There is thus a need for synchronous memory systems which in one aspect allow efficient use of synchronous memory resources, e.g., by reducing the use of wait states. Moreover, there is also a need for memory systems which in another aspect allow efficient usage of shared memory with respect to adjusting for accesses by a plurality of accessing agents.

SUMMARY OF THE INVENTION

In accordance with the principles of the present invention, a multiple agent system using shared memory comprises a memory including a plurality of memory banks. A first agent is adapted to access a first memory portion including a first number of the memory banks. A second agent is adapted to access a second memory portion including a second number of the memory banks, wherein the first number and the second number are variable.

In another aspect, the present invention provides a system comprising a plurality of agents. A shared memory block is accessible by each of the agents, the shared memory block including a plurality of memory banks. A register is adapted to partition the shared memory block into a plurality of partitions, each of the plurality of partitions being accessible by a unique group of the agents.

In yet another aspect for providing a system with access to shared memory, a first agent provides a memory access clock signal to allow the first agent to access the shared memory. A second agent using the memory access clock signal accesses the shared memory in synchronism with the access by the first agent to the shared memory.

A method of synchronizing access from a plurality of agents to shared memory in accordance with the principles of the present invention comprises providing a memory access clock signal. The shared memory is firstly accessed from a first agent based on the memory access clock signal. The shared memory is secondly accessed from a second agent based on the memory access clock signal. Wherein, the second access follows the first access without a wait state therebetween.

In a method of partitioning a shared memory in accordance with another aspect of the present invention, a configuration register is set to partition the shared memory into a first plurality of memory banks and a second plurality of memory banks. The first plurality of memory banks is accessed from a first agent, and a second plurality of memory banks is accessed from a second agent. Then, the shared memory is re-partitioned on-the-fly.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
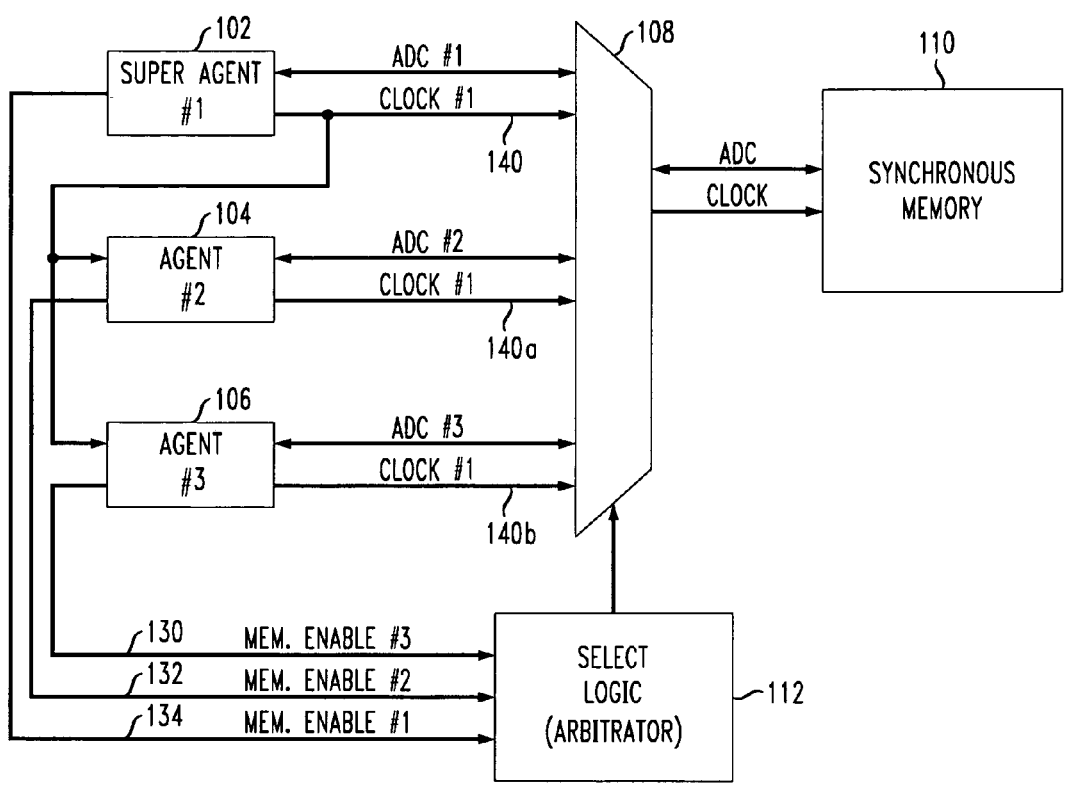
FIG. 1 shows a first embodiment of a first aspect of the present invention wherein a memory system has one or more agents which utilize a clock signal from a super agent to synchronize clock signal access timing to the shared synchronous memory.

FIG. 1 shows a first embodiment of a first aspect of the present invention wherein a multiple agent system has one or more agents which utilize a clock signal from a super agent to synchronize clock signal access timing to the shared synchronous memory.

In particular, a synchronous memory block 110 is accessed by a plurality of agents 102–106 as shown in FIG. 1. Although three agents 102–106 are shown in FIG. 1, the present invention relates to multiple agent systems having any number of agents accessing shared memory.

An appropriately sized multiplexer (MUX) 108 forms a switch which allows any one of the multiple agents 102–106 to access the shared synchronous memory 110. The relevant busses for each agent 102–106 include the address, data and control (ADC) busses and a clock signal.

The MUX 108 is controlled by selecting logic, i.e., an arbitrator 112. The arbitrator 112 is provided with respective memory request signals 130–134 from each of the accessing agents 102–106, and based on a pre-determined hierarchy, allows one of the agents 102–106 to access the shared synchronous memory 110. The requesting agents 102–106 are informed of a granting of the busses to the shared synchronous memory 110 using an acknowledge signal from the arbitrator 112 back to the successful requesting agent.

Importantly, the respective clock signals 140, 140a and 140b from the multiple agents 102–106 are synchronized with one another to reduce and/or eliminate the need for wait states in accessing the shared synchronous memory 110, particularly when switching between accesses from the different agents 102 to 106. Thus, not only does the memory access speed from each of the agents 102–106 become the same with respect to each of the different agents 102–106, but the phase of the respective clock signal from each of the agents 102–106 becomes the same with respect to one another.

In the embodiment shown in FIG. 1, one agent is pre-determined to be a 'super agent', e.g., 102, and the remaining agents 104 and 106 are thus considered to be 'non-super agents' or simply 'agents'. A difference between a super agent and a non-super agent as the term is used herein is the way in which communication is made with the shared synchronous memory 110. Typically, a super agent does not allow any clock cycles to be wasted, i.e., wait states to be inserted, for negotiation or arbitration with the shared synchronous memory 110. Once the memory request signal is submitted by the super agent, the access to the shared synchronous memory 110 follows. On the other hand, a non-super agent has the capability of waiting for an acknowledge signal after submitting a memory request signal.

The super agent 102 is responsible for generating a clock signal 140 which is switched to the shared synchronous memory 110 through the MUX 108 when the super agent 102 is accessing the shared synchronous memory 110. Preferably, but not necessarily, the super agent 102 will be that agent which most frequently accesses the shared synchronous memory 110 from among the multiple agents 102–106, or is otherwise assigned the highest priority for access to the shared synchronous memory 110.

As shown in FIG. 1, the clock signal 140 from the super agent 102 is input to the remaining or non-super agents 104–106. The remaining agents 104–106 output a representation of the same clock signal 140 for their own accesses to the shared synchronous memory 110, as shown by signals 140*a* and 140*b*. The non-super agents 104, 106 synchronize the respective address, data and control bus interfaces within the non-super agents 104, 106 to the input clock signal 140. Accordingly, all memory accesses to the shared synchronous memory 110, whether originated from the super agent 102 or any other agent 104, 106, will be synchronized. Thus, wait states are not necessary between accesses to the shared synchronous memory 110 by the various agents 102–106.

The non-super agents 104, 106 which receive the clock signal 140 from the super agent 102 are free to use the clock signal 140 for other purposes as well as for accessing the shared synchronous memory 110. For instance, the clock signal 140 may be used as a general processor clock in place of an external crystal oscillator.

Figure 2:
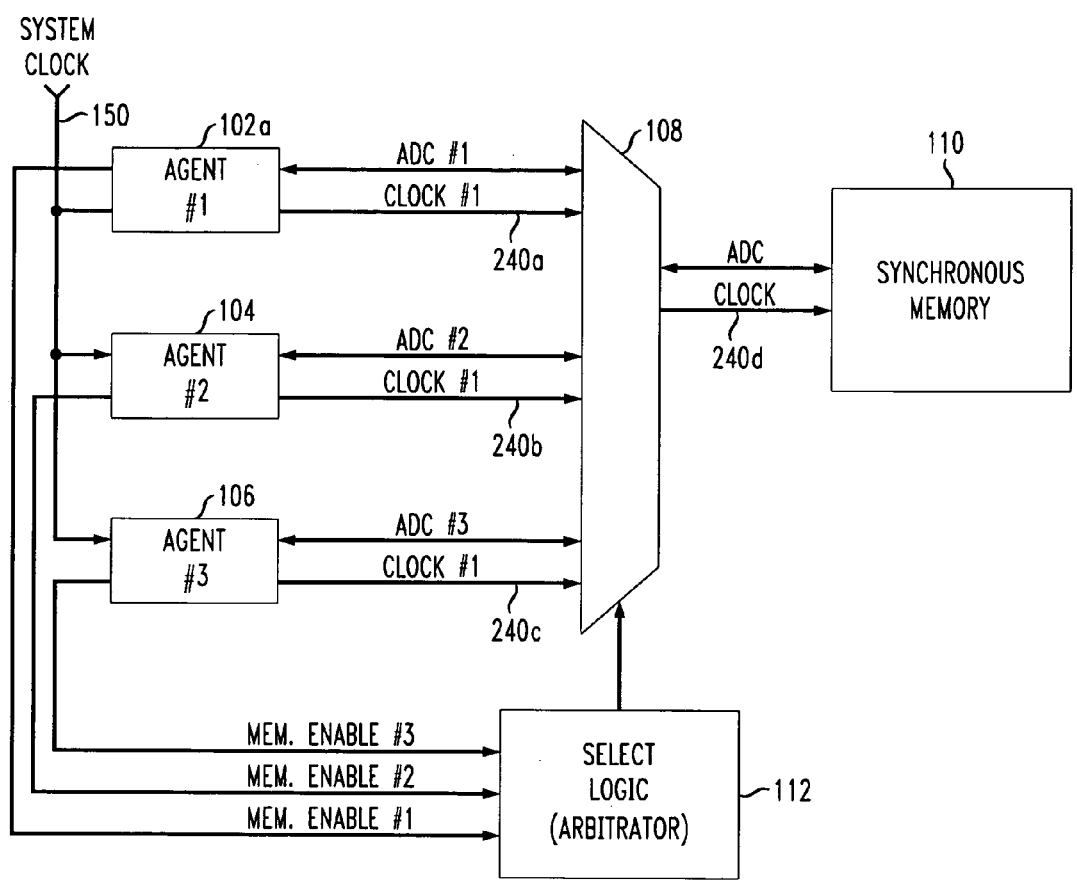
FIG. 2 shows a second embodiment of the first aspect of the present invention wherein a memory system has one or more agents which utilize a system clock signal to synchronize clock signal access timing to the shared synchronous memory.

FIG. 2 shows a second embodiment of the first aspect of the present invention wherein all agents 102*a*, 104 and 106 are non-super agents using a shared system clock signal 150 to synchronize clock signal access timing to the shared synchronous memory 110.

In particular, the shared synchronous memory 110 may be conventional and is as described and shown with respect to the embodiment of FIG. 1. Moreover, the MUX 108, arbitrator 112 and non-super agents 104, 106 are as described and shown with respect to FIG. 1. In this embodiment, however, the super-agent 102 shown in FIG. 1 is replaced with a non-super agent 102*a*.

All three agents 102–106 receive a system level clock signal 150 to which respective address, data and control busses as well as respective memory access clock signals 240*a*–240*c* are synchronized. Thus, the clock signal 240*d* provided to the shared synchronous memory 110 is synchronized, e.g., has the same frequency, duty cycle and/or phase with respect to the clock signals 240*a*, 240*b* or 240*c* from any of the agents 102*a*, 104 and 106. This reduces or eliminates altogether the need for wait states in memory accesses from any of the agents 102–106.

In a variation of the embodiment shown in FIG. 2, the clock signals 240*a*, 240*b* and 240*c* may be eliminated and the system clock signal 150 may be directly provided to the shared synchronous memory 110, with the address, data and control busses of all agents 102*a*, 104, 106 being appropriately timed.

The super agent 102 may have any arbitrary clock signal 140 for accessing the shared synchronous memory 110. However, the non-super agents 104, 106 must be able to adopt the clock signal 140 from the super agent 102 for use in their respective accesses to the shared synchronous memory 110. Moreover, for each partition or block of sharedly accessed memory 110, preferably only one super agent 102 is allowed, with any or all other agents 104, 106 for that partition being non-super agents which adopt the memory access clock signal 140 from the super agent 102.

Thus, according to the first aspect of the present invention, the memory clock signals from a plurality of agents are synchronized with one another to minimize or eliminate altogether the delays, i.e., wait states, caused in accessing shared synchronous memory.

Figure 3:
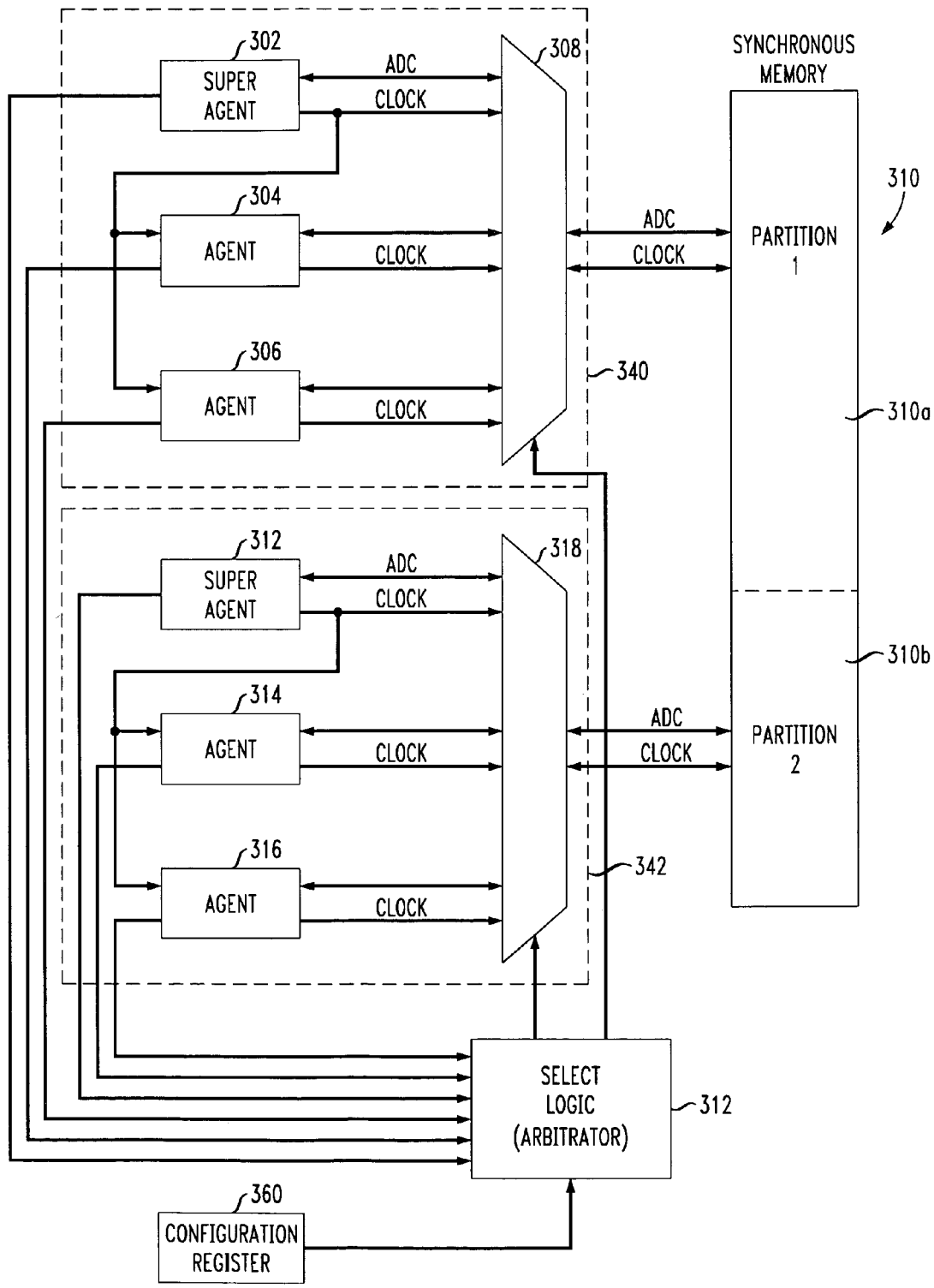
FIG. 3 shows another aspect of the present invention wherein a shared memory is configurably partitioned to assign a pre-defined number of memory banks to each accessing agent.
Figure 4A:
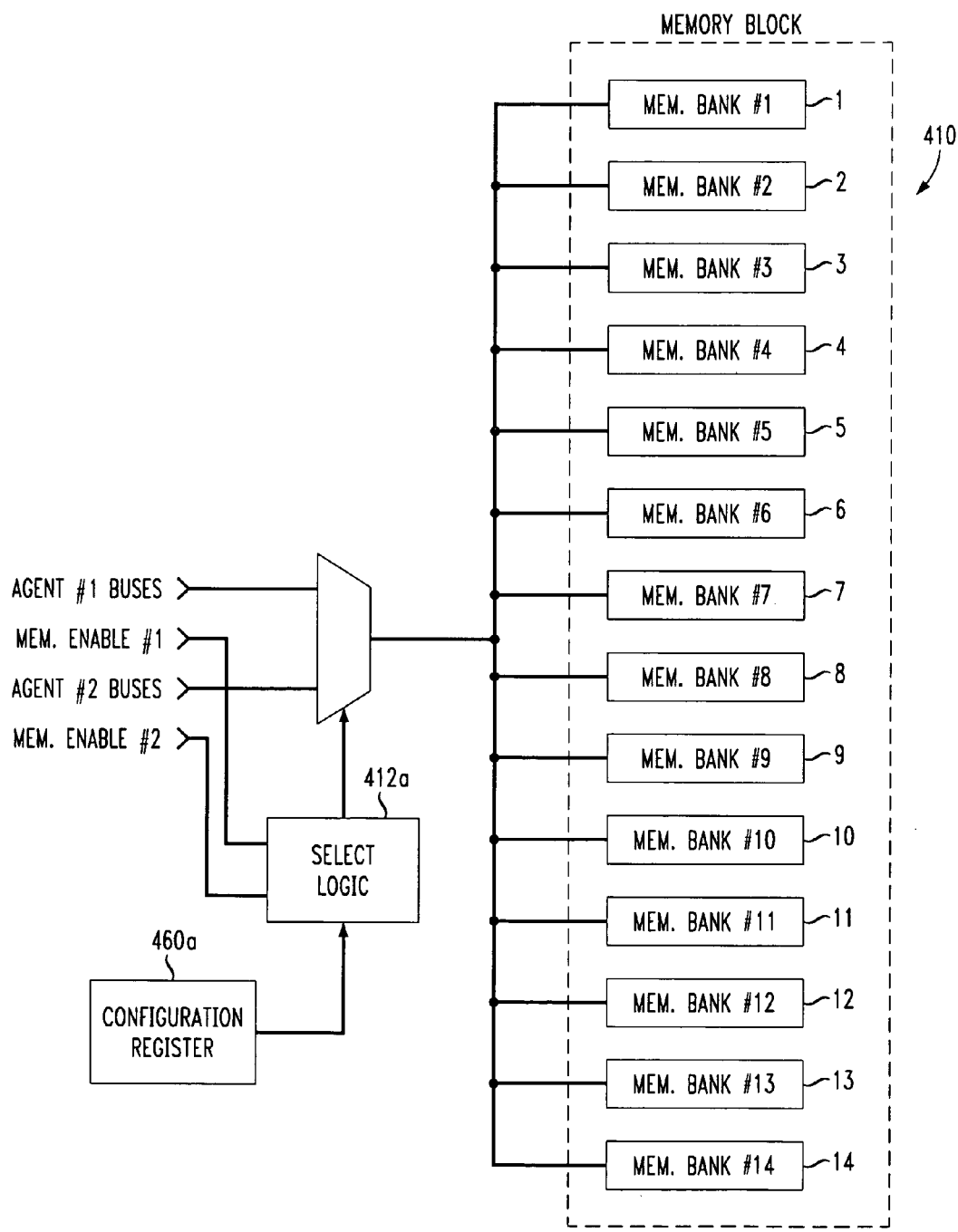
FIG. 4A shows one embodiment of the partitionable memory system shown in FIG. 3.
Figure 4B:
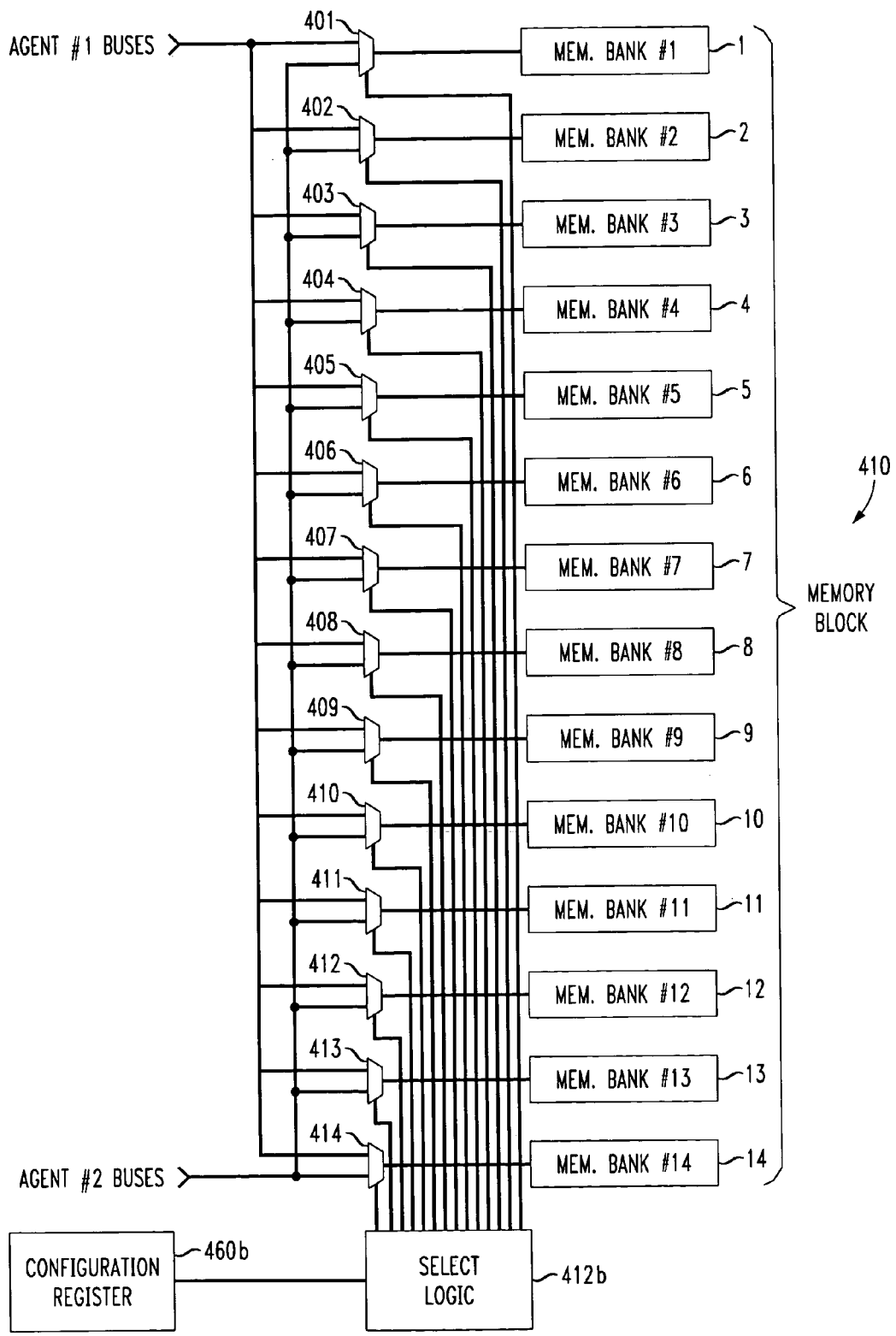
FIG. 4B shows another embodiment of the partitionable memory system shown in FIG. 3.
Figure 5:
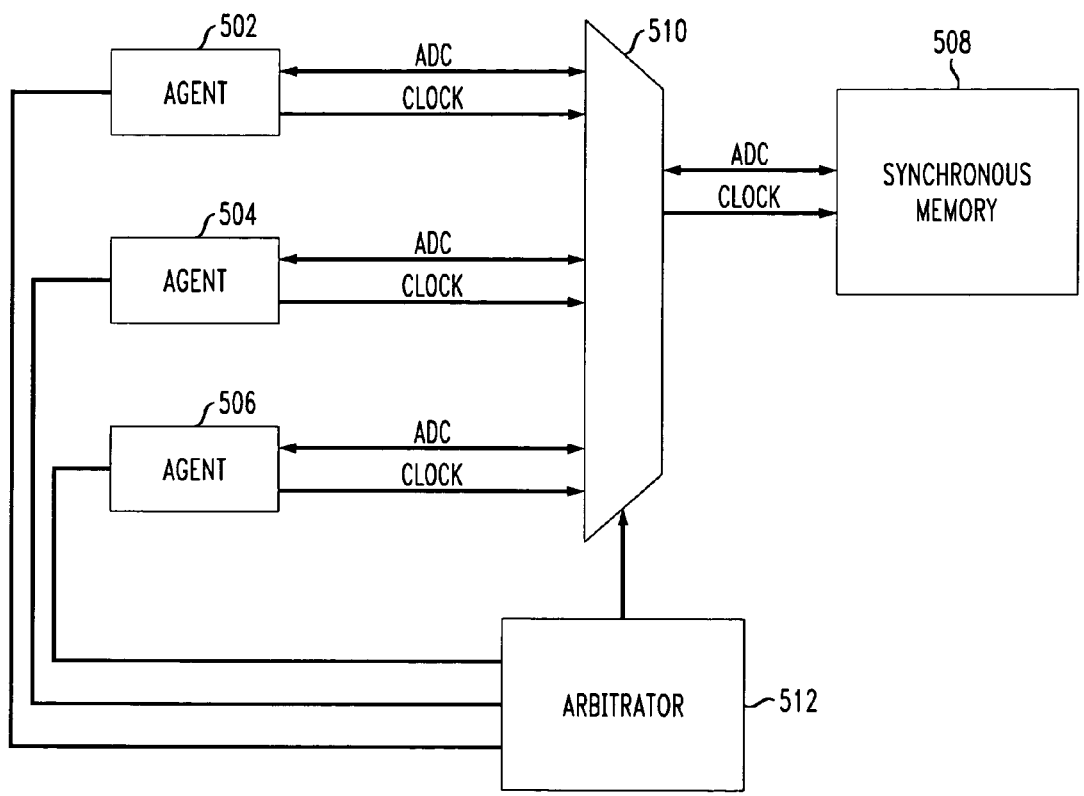
FIG. 5 shows a plurality of agents accessing a synchronous memory block in accordance with a conventional memory system.
Figure 6:
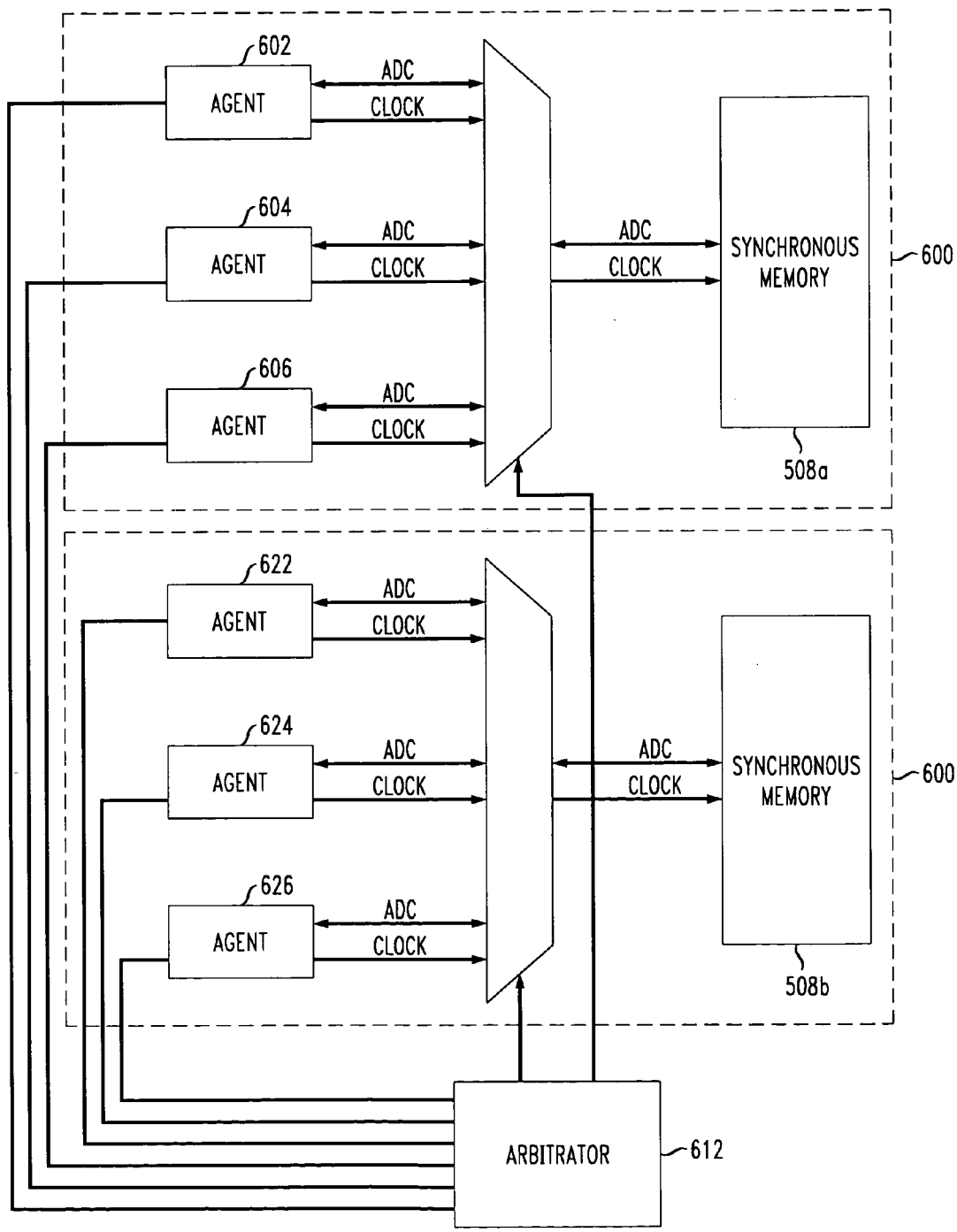
FIG. 6 shows a plurality of agents accessing a plurality of synchronous memory blocks in accordance with another conventional memory system.

According to another aspect of the present invention shown in FIGS. 3, 4A and 4B, a shared memory block is partitioned for use by individual ones or groups of agents.

For instance, FIG. 3 shows the other aspect of the present invention wherein a shared memory is configurably partitioned to assign a pre-defined number of memory banks to each accessing agent or group of agents. Although FIG. 3 shows synchronous memory 310, this aspect of the present invention relates equally to asynchronous memory.

The embodiment of FIG. 3 is shown with respect to two groups of accessing agents, i.e., a first group of shared memory accessing agents 340 including a super agent 302 and non-super agents 304 and 306, and a second group of shared memory accessing agents 342 including another super agent 312 and two more non-super agents 314, 316. Although the embodiment of FIG. 3 is shown with respect to two agent groups 340, 342, the present invention is equally applicable to more than two groups of accessing agents to a shared memory block. Moreover, although the agent groups 340, 342 are shown with an equal number of agents, the present invention is equally applicable to groups of accessing agents having any number of agents.

In accordance with the second aspect of the present invention, the memory block 310 is configurably partitioned into a corresponding number of partitions 310*a*, 310*b*. Although the embodiment is shown with two partitions 310*a*, 310*b*, the invention is equally applicable to any number of partitions. Preferably, the number of partitions will equal the number of agent groups.

The separate agent groups 340, 342 access respectively partitioned portions of the shared memory 310. The partitions 310*a*, 310*b* may be any size, from zero to the entire memory block 310, as set in a configuration register 360.

In this aspect, the assignment of an available memory block 310 is flexible, allowing any or all of the memory block 310 to be assigned to any of the agent groups 340, 342. With the configurability as disclosed, the user can change the memory configuration on-the-fly, by executing certain instructions in the code to change the value in the configuration register 360.

The configuration register 360 can be written to by any of the agents 302, 304, 306, 312, 314 and 316. In the disclosed embodiment, the value written to the configuration register 360 corresponds to the length of the first partition 310*a*, any and all remaining memory banks being assigned to the second partition. Of course, multiple words or registers may be implemented within the configuration register 360 to accommodate more than two configurable partitions in the shared memory block 310 in accordance with the principles of the present invention.

It is preferred (but not required) that the memory block 310 be partitionable into contiguous parts. For instance, if the configuration register 360 comprises one, four-bit register, it may adequately represent partitions between any of up to sixteen memory banks.

For example, assume for the purpose of explanation that there are fourteen memory banks in the memory block 310. If any of the agents 302, 304, 306, 312, 314 or 316 writes the value '9' (1001B) to the configuration register 360, this would be interpreted by the arbitrator 312 to partition the memory block 310 such that the first nine individual memory banks are to be assigned to the first agent group 340, and that the remaining five individual memory banks are to be assigned to the second agent group 342. The four bits of the configuration register 360 are then decoded by the arbitrator 412*a* to provide appropriate control signals to a first MUX 308 to select or deselect the requesting or winning agent in the first agent group 340 and to the second MUX 318 to select or deselect the requesting or winning agent in the second agent group 342. Because the memory block 410 is partitioned, both agent groups 340, 342 may access the respective partition 310*a*, 310*b* without conflict.

To avoid configuration conflicts, it may be preferable to allow only one or a select group of agents to have write access to the configuration register 360.

In a multiple agent system, one shared memory block is often provided for use by all agents in the system. For various reasons, e.g., vastly differing application programs in each of the agents for any one user, a fixed amount of memory for each agent in the system is inefficient. For instance, if one user implements code in only one of two available DSPs in an integrated circuit comprising a memory accessing system in accordance with the aspects of the present invention, then that user will have minimal if any memory requirement for the second DSP. In that case, it might be desirable to assign or partition all available shared memory to the first DSP and no memory to the second DSP.

According to this aspect of the present invention, the assignment of individual memory banks 1 to 14 as shown in FIGS. 4A and 4B is performed in a flexible manner. Of course, although the embodiments of FIGS. 4A and 4B are shown with respect to fourteen individual memory banks, the invention is equally applicable to shared memory blocks having any number of individual memory banks.

Preferably, the partitions in a shared memory block will be placed with ends thereof between individual memory banks comprising the memory block, e.g., between any of the memory banks 1 to 14 as shown in FIG. 4A. The partitioning of a shared memory block with respect to a plurality of agents in accordance with this aspect of the present invention may be performed with synchronous and/or asynchronous memory. Thus, FIGS. 4A and 4B show a memory bank 410 comprising individual memory banks 1 to 14 of either synchronous (e.g., SDRAM) memory or asynchronous (e.g., DRAM) memory.

FIG. 4B shows another embodiment of the partitionable memory system shown in FIG. 3. In this embodiment, each memory bank 1 to 14 is configurably selected by any accessing agent, e.g., agent #1 or agent #2, by suitable multiplexers 401 to 414 which are individually controlled by selecting logic (arbitrator) 412*b*. The arbitrator 412*b* implements partitions in the memory block 410 set in the configuration register 460*b*.

An application example of this aspect of the present invention is as follows. Assume that there are two agents in a system, where each agent is a DSP. Initially, the first DSP may be running a modem application program requiring at least seven memory banks, and the second DSP may be running a medium quality audio session requiring at least seven memory banks. In this case, the configuration register may be set to a '7' (0111B) to assign the first seven memory banks 1–7 to the first DSP, and the remaining seven memory banks 8–14 to the second DSP. Then, at a later point in time, the user may run a high quality audio session at the second DSP which requires 12 memory banks. Either the first or second DSP can adjust the setting in the configuration register 460 to appropriate more memory banks to the second DSP, albeit at the expense of the size of the memory partition for the first DSP. For instance, in this case, a value of '2' (0010B) may be written to the configuration register 460 to assign two memory banks 1, 2 to the first DSP leaving the remaining twelve memory banks 3–14 in the second partition of the memory block for use by the second DSP. Conversely, the user may at another point in time wish to run a higher baud rate modem program on the first DSP requiring a larger amount of memory. In this case, the configuration register may be written to, e.g., to assign eleven memory banks 1–11 to the first DSP leaving only the remaining three memory banks 12–14 for use by the second DSP.

While the invention has been described with reference to the exemplary embodiments thereof, those skilled in the art will be able to make various modifications to the described embodiments of the invention without departing from the true spirit and scope of the invention.

What is claimed is:

1. A system comprising:
    an external non-dedicated synchronous memory including a plurality of memory banks;
    a first agent providing a first agent clock signal adapted to control access to a first portion of said non-dedicated synchronous memory including a first number of said plurality of memory banks; and
    a second agent lacking a dedicated clock generator, receiving said first agent clock signal from said first agent on a dedicated clock line, and providing a second agent clock signal to access a second portion of said non-dedicated synchronous memory including a second number of said plurality of memory banks;
    wherein said second agent clock signal is synchronized to and in-phase with said first agent clock signal; and
    said first number and said second number being variable.
2. The system according to claim 1, further comprising:
    a register to set at least one of said first number and said second number.
3. The system according to claim 1, wherein:
    said register is adapted to be set by either one of said first agent and said second agent.
4. The system according to claim 1, wherein:
    a value set in said register is adapted to correspond to said first number of said plurality of memory banks.
5. The system according to claim 1, wherein:
    said second number is a remainder of said plurality of said memory banks after said first number of said plurality of memory banks.
6. The system according to claim 1, wherein:
    said first agent is a first digital signal processor; and
    said second agent is a second digital signal processor.
7. A system comprising:
    a first agent;
    a plurality of second agents;
    an external non-dedicated shared synchronous memory accessible by said first agent and each of said plurality of second agents, said external non-dedicated shared memory including a plurality of memory banks; and
    a register adapted to partition said external non-dedicated shared synchronous memory into a plurality of partitions, each of said plurality of partitions being accessible by a unique group of said first agent and said plurality of second agents;
    wherein said plurality of partitions each comprise a number of said plurality of memory banks; and
    wherein said plurality of second agents lacking a dedicated clock generator, each receive a common base clock signal on a dedicated clock line from said first agent and access said external non-dedicated shared synchronous memory with a memory access clock signal synchronized and in phase with said common base clock signal.

8. The system according to claim 7, wherein: said register is setable by at least one of said first agent and said plurality of second agents.

9. The system according to claim 8, wherein: said non-dedicated shared synchronous memory is synchronous dynamic random access memory.

10. A system for providing access to shared external non-dedicated synchronous memory, said system comprising:
 a first agent to provide a first agent memory access clock signal to allow said first agent to access said shared external non-dedicated synchronous memory; and
 a second agent lacking a dedicated clock generator, receiving said first agent memory access clock signal on a dedicated clock line from said first agent, and providing a second agent memory access clock signal to access said shared external non-dedicated synchronous memory in synchronism with said access by said first agent to said shared external non-dedicated synchronous memory;
 wherein each of said first agent and said second agent may access different portions of said shared external non-dedicated memory simultaneously.

11. The system for providing access to shared external non-dedicated synchronous memory according to claim 10, wherein:
 said shared external non-dedicated synchronous memory services in turn said first agent and said second agent without a wait state therebetween.

12. The system for providing access to shared external non-dedicated synchronous memory according to claim 10, wherein:
 said shared external non-dedicated synchronous memory is partitioned such that said first agent has access to a first partition of said shared external non-dedicated synchronous memory and said second agent has access to a second partition of said shared external non-dedicated synchronous memory.

13. The system for providing access to shared external non-dedicated synchronous memory according to claim 10, wherein:
 said first agent is a first digital signal processor; and
 said second agent is a second digital signal processor.

14. A method of synchronizing access from a plurality of agents to external non-dedicated shared synchronous memory, comprising:
 providing a memory access clock signal from a first agent to a second agent on a dedicated clock line, said second agent lacking a dedicated clock generator;
 providing a representation of said memory access clock signal in synchronism and in phase with said memory access clock signal;
 firstly accessing a portion of said external non-dedicated shared synchronous memory from said first agent based on said memory access clock signal; and
 secondly accessing a portion of said external non-dedicated shared synchronous memory from said second agent based on said representation of said memory access clock signal;
 wherein said secondly accessing follows said firstly accessing without a wait state therebetween.

15. The method of synchronizing access from a plurality of agents to shared synchronous memory according to claim 14, wherein:
 said second agent generates said representation of said memory access clock signal.

16. The method of synchronizing access from a plurality of agents to shared synchronous memory according to claim 14, wherein:
 said first agent provides said memory access clock signal.

17. A method of partitioning an external non-dedicated shared synchronous memory, comprising:
 setting a configuration register to partition said external non-dedicated shared synchronous memory into a first plurality of synchronous memory banks and a second plurality of synchronous memory banks;
 accessing said first plurality of synchronous memory banks from a first agent;
 accessing said second plurality of synchronous memory banks from a second agent; and
 re-partitioning said external non-dedicated shared synchronous memory on-the-fly;
 wherein said second agent, lacking a dedicated clock generator, receives a clock signal on a dedicated clock line from said first agent and generates a second agent clock signal for said second agent's access to said non-dedicated shared synchronous memory.

18. The method of partitioning an external non-dedicated shared synchronous memory according to claim 17, wherein:
 said re-partitioning is performed from said first agent.

19. Apparatus for synchronizing access from a plurality of agents to shared synchronous memory, said apparatus comprising:
 means for providing a memory access clock signal from a first agent to a second agent on a dedicated clock line, said second agent lacking a dedicated clock generator;
 means for firstly accessing said shared synchronous memory from said first agent based on said memory access clock signal;
 means for secondly accessing said shared synchronous memory from said second agent based on a second agent memory access clock signal synchronized and in-phase with said memory access clock signal;
 wherein said means for second accessing accesses said shared synchronous memory without a wait state after said means for firstly accessing said shared synchronous memory accesses said shared synchronous memory.

20. Apparatus for partitioning a shared synchronous memory, said apparatus comprising:
 means for setting a configuration register to partition said shared synchronous memory into a first plurality of synchronous memory banks and a second plurality of synchronous memory banks;
 means for accessing said first plurality of synchronous memory banks from a first agent;
 means for accessing said second plurality of synchronous memory banks from a second agent that lacks a dedicated clock generator receives a clock signal on a dedicated clock line from said first agent and generates a second agent clock signal in synchronism and in-phase with said received clock signal, for said second agent's access to said shared synchronous memory;
 means for re-partitioning said shared synchronous memory on-the-fly.

* * * * *